US007469736B2

(12) United States Patent
Fries et al.

(10) Patent No.: US 7,469,736 B2
(45) Date of Patent: Dec. 30, 2008

(54) LABEL APPLICATOR

(75) Inventors: Todd Fries, Waukesha, WI (US); William K. Lueschen, Cedarburg, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 527 days.

(21) Appl. No.: 10/825,493

(22) Filed: Apr. 15, 2004

(65) Prior Publication Data

US 2004/0211522 A1 Oct. 28, 2004

Related U.S. Application Data

(60) Provisional application No. 60/464,508, filed on Apr. 22, 2003.

(51) Int. Cl.
*B32B 15/00* (2006.01)

(52) U.S. Cl. ........................ 156/541; 156/229; 156/443

(58) Field of Classification Search ........................ None
See application file for complete search history.

(56) References Cited

U.S. PATENT DOCUMENTS

| | | | | |
|---|---|---|---|---|
| 4,004,362 | A | 1/1977 | Barbieri | |
| 4,055,616 | A * | 10/1977 | Keen et al. | 264/139 |
| 4,602,976 | A * | 7/1986 | Fukuda et al. | 156/433 |
| 4,655,129 | A | 4/1987 | Wirth et al. | |
| 4,770,729 | A * | 9/1988 | Spencer et al. | 156/73.1 |
| 4,920,882 | A | 5/1990 | Hoyt | |
| 5,342,461 | A | 8/1994 | Murphy | |
| 5,372,443 | A | 12/1994 | Borucki, Jr. et al. | |
| 5,843,252 | A | 12/1998 | Murphy | |
| 5,863,383 | A * | 1/1999 | Bussey | 156/530 |
| 6,103,051 | A * | 8/2000 | Bussey | 156/252 |
| 6,211,117 | B1 | 4/2001 | Haggerty et al. | |
| 6,266,075 | B1 | 7/2001 | Feitel et al. | |
| 6,277,456 | B1 | 8/2001 | Bulgrin et al. | |
| 6,350,070 | B1 * | 2/2002 | Tasma | 400/55 |
| 6,616,360 | B2 | 9/2003 | Lehmkuhl | |
| 6,664,995 | B2 | 12/2003 | Milton et al. | |
| 6,742,858 | B2 | 6/2004 | Lehmkuhl et al. | |
| 6,875,304 | B2 * | 4/2005 | Schanke et al. | 156/277 |
| 7,178,572 | B2 * | 2/2007 | Schanke et al. | 156/443 |
| 7,231,952 | B2 * | 6/2007 | Schanke et al. | 156/446 |

FOREIGN PATENT DOCUMENTS

| | | |
|---|---|---|
| GB | 2320225 | 6/1998 |
| WO | WO 8801247 A * | 2/1988 |
| WO | WO 2006/099625 A2 | 9/2006 |
| WO | WO 2006/102000 A2 | 9/2006 |

* cited by examiner

*Primary Examiner*—Philip C Tucker
*Assistant Examiner*—Kimberly K McClelland
(74) *Attorney, Agent, or Firm*—Ryan Kromholz & Manion, S.C.

(57) ABSTRACT

An apparatus and method for wrapping adhesive backed labels around elongate articles, such as electrical wires including a rotatable puck assembly having an interrupted circumferential surface defining an opening for receiving an elongate object to be labeled and wing members for applying the label during rotation.

4 Claims, 19 Drawing Sheets

LABEL APPLICATOR

RELATED APPLICATIONS

This application claims the benefit of co-pending provisional patent application Ser. No. 60/464,508, filed 22 Apr. 2003.

BACKGROUND OF THE INVENTION

This invention relates to an automatic bench tool for automatic application of labels to wires, cables, or other elongate articles.

In the past, labels have been applied to elongate articles such as wires and cables by way of applicators requiring cumbersome, noisy hydraulic or high-pressure air lines. Further, several problems have burdened the efficiency of such applicators. For example, previous label applicators have required the operator to manually handle the labels during application. This results in skin oil and dirt contamination of labels. Label contamination also may cause flagging and an end product having an unfinished appearance. The present applicator requires no such manual handling and therefore produces a clean, finished product. Additionally manufacturers using prior art applicators typically allocate more than fifteen seconds to manually apply one standard label. The applicator of the present invention can complete the process in less than half the time, thus providing an increase in productivity and reduction in labor costs.

It is an object of the present invention to provide a new method and apparatus for wrapping labels around elongate objects and the like.

Another object of the present invention is to provide a method and apparatus that quickly and efficiently wraps labels around elongate objects such as wires, cables and the like.

Still another object of the present invention is to provide an apparatus that is easy to use.

Yet another object of the present invention is to provide an apparatus that may be used with elongate articles of various diameters.

Still yet another object of the present invention is to provide and apparatus and method that produces a finished product having minimal flagging or other undesirable characteristics.

SUMMARY OF THE INVENTION

Briefly, to achieve the desired objects of the instant invention, and in accordance with a preferred embodiment thereof, provided is an apparatus and a method for applying labels around elongate articles such as wire, cable, or the like. Additionally, this invention may be used in conjunction with other tools as for instance an external wire-cutting machine, or a thermal transfer printer for printing labels on demand.

In a preferred embodiment of the present invention, the apparatus includes a means for receiving labels, at least one label sensor, at least one guide roller to guide at least one label toward a label stripper assembly, a gripper assembly carried on a gripper arm assembly for grasping an elongate object, means for driving the gripper arm assembly, a puck assembly having an article receiving opening, and means for driving the puck assembly.

The preferred labels to be used in accordance with the present invention are preferably continuous sheets of a suitable label material carried on continuous sheets of releasable liner material. The labels may be preprinted and supplied in a spindled roll, or may be printed at need by an optionally attached printing system, thus allowing labels to be easily kitted for each label job. Further, the labels may preferably include datum marks printed on the liner material.

A method according to the present invention includes the steps of:

1. Providing at least one label having an adhesive backing and liner.
2. Introducing the label to a label applicator apparatus.
3. Moving the label toward a label stripping assembly.
4. Partially removing the liner from the label so as to expose a portion of the label adhesive backing.
5. Providing an elongate object to be labeled.
6. Moving the elongate object toward the exposed portion of the label adhesive backing.
7. Engaging a surface of the elongate object with the exposed portion of the label adhesive backing.
8. Providing a puck assembly having a cavity; said cavity including a pair of wing members, said wing members being normally biased towards one another.
9. Moving the engaged surface of the elongate article and attached label into the puck cavity and between the normally biased wing members.
10. Rotating the puck assembly and wing members around the elongate article and attached label, thereby securing the label entirely around the diameter of the elongate article.
11. Removing the elongate article and secured label from the puck cavity.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
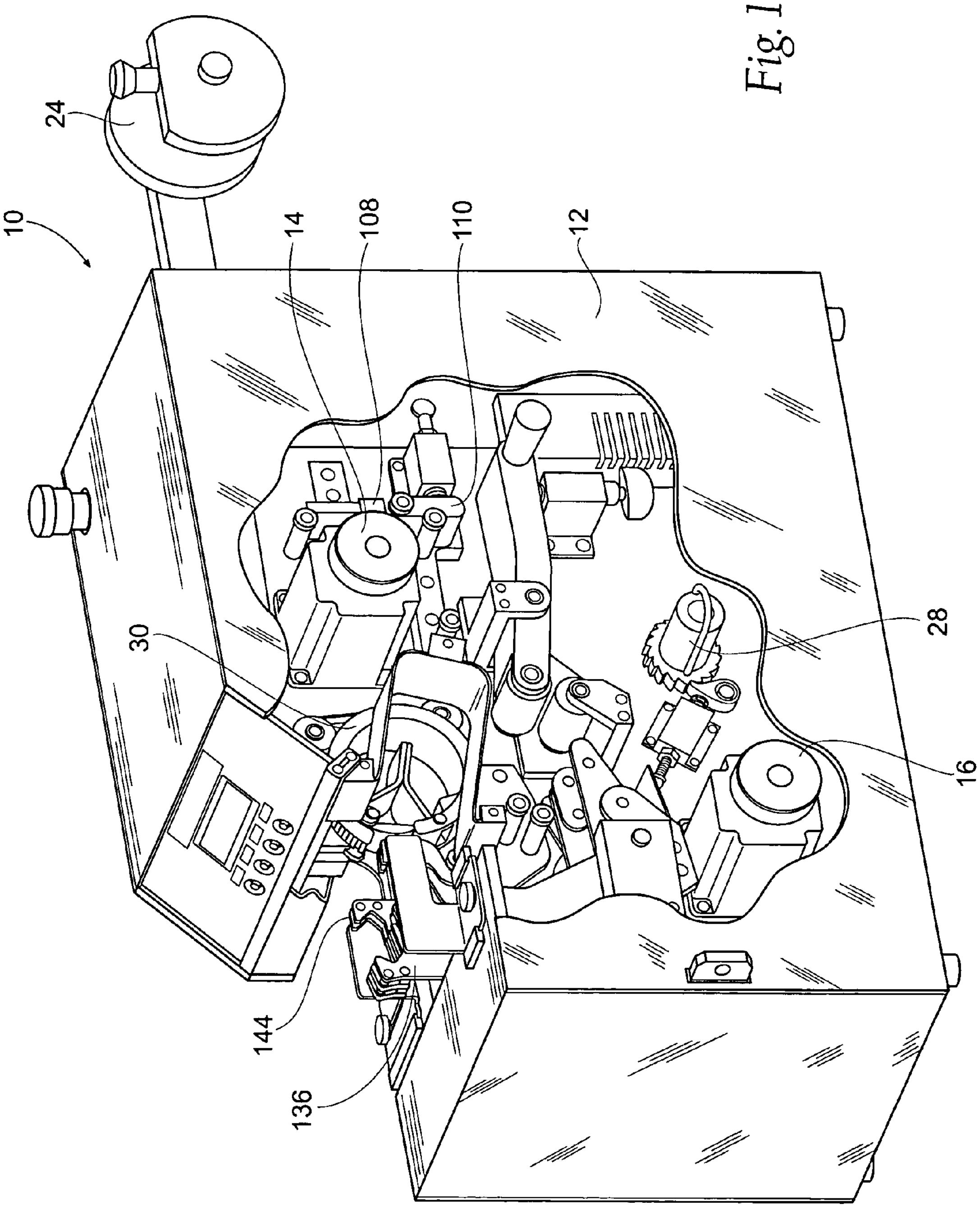
FIG. 1 is a perspective view of one side of the present invention and including a partially broken away portion.

Turning now to the drawings, in which like reference numerals refer to corresponding elements throughout the views, attention is first directed to FIG. 1 illustrating a perspective view of the apparatus 10 with a portion of the side panel 12 broken away so that the various components of the apparatus 10 may be seen.

Figure 3:
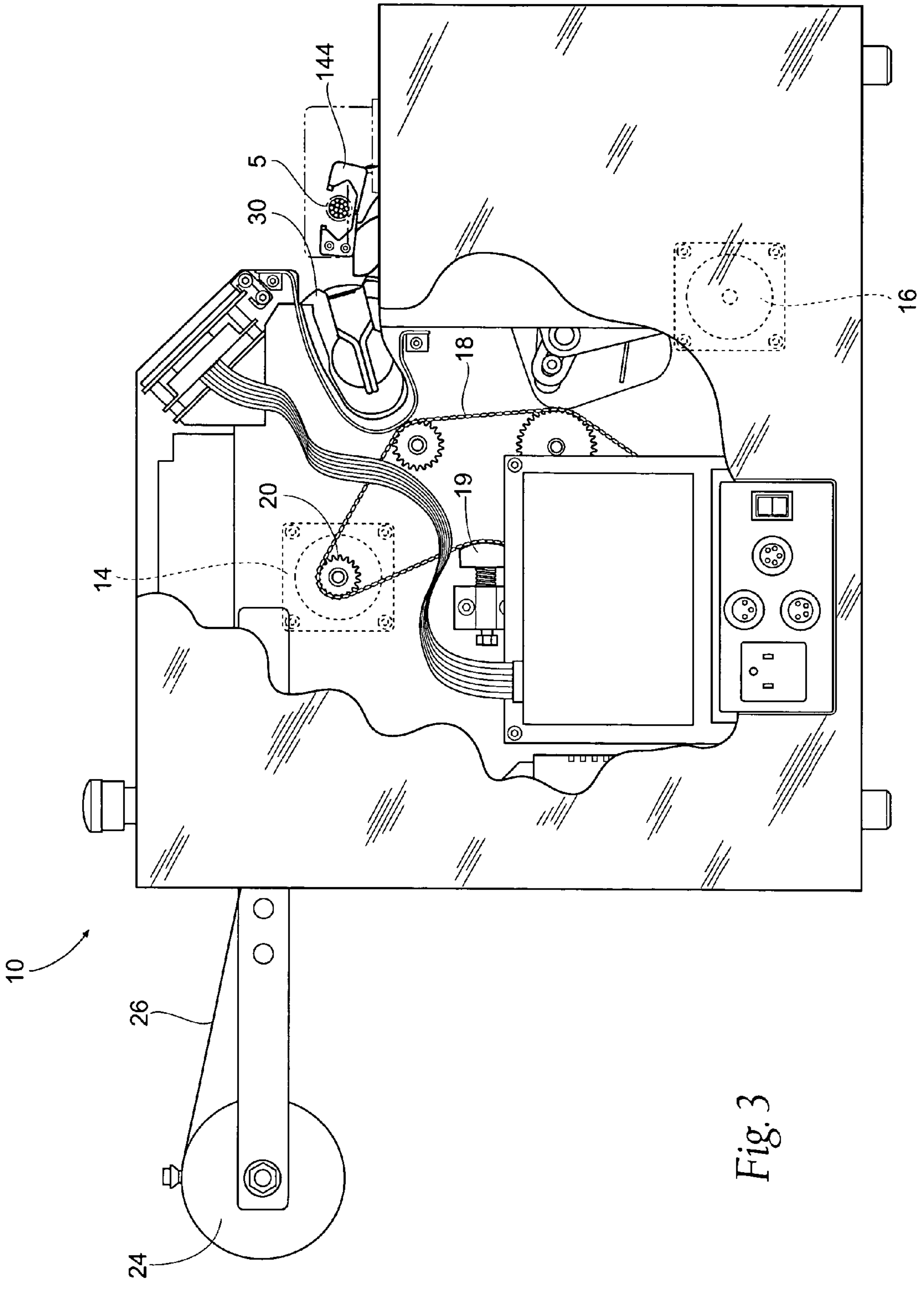
FIG. 3 is a side plan view of the present invention and showing the side opposite that shown in FIGS. 1 and 2, and further illustrating a partially broken away portion.

The label assembly 10 preferably includes two independently operated motors, the first of which will be identified herein as a drive motor 14, the second of which will be identified as a gripper arm motor 16. As may be seen particularly in FIGS. 3 and 4, the drive motor 14 is preferably arranged to provide power to a continuous chain drive belt 18 under tension supplied by a conventional take up tensioner 19. The continuous drive belt 18 engages spaced sprockets 20 extending from axially extending spindles 22.

As may be seen in FIGS. 1-4, the apparatus 10 preferably includes a label roller assembly 24 for carrying spooled labels 26 of the type to be used with the present invention, and a label take-up roll structure 28. The label roller assembly 24 being arranged to facilitate label feed from a roll of labels 26 into the apparatus 10 and the take-up roll structure 28 being arranged to receive and wind up backing material 27 once the labels have been removed (see particularly FIG. 2).

As seen in the Figures and particularly FIGS. 6-9, the present invention further includes a novel puck assembly 30. The puck assembly 30 is adapted to receive an elongate object 5 for wrapping labels 26 thereon. As seen, the puck assembly 30 preferably includes a c-shaped puck element 32 having an interrupted circumferential surface 34. The interrupted circumferential surface 34 includes a marginal edge portion 36 preferably having a toothed configuration. Seen particularly in FIG. 8, the marginal edge 36 further includes an axially extending marginal support shelf 38.

Figure 6:
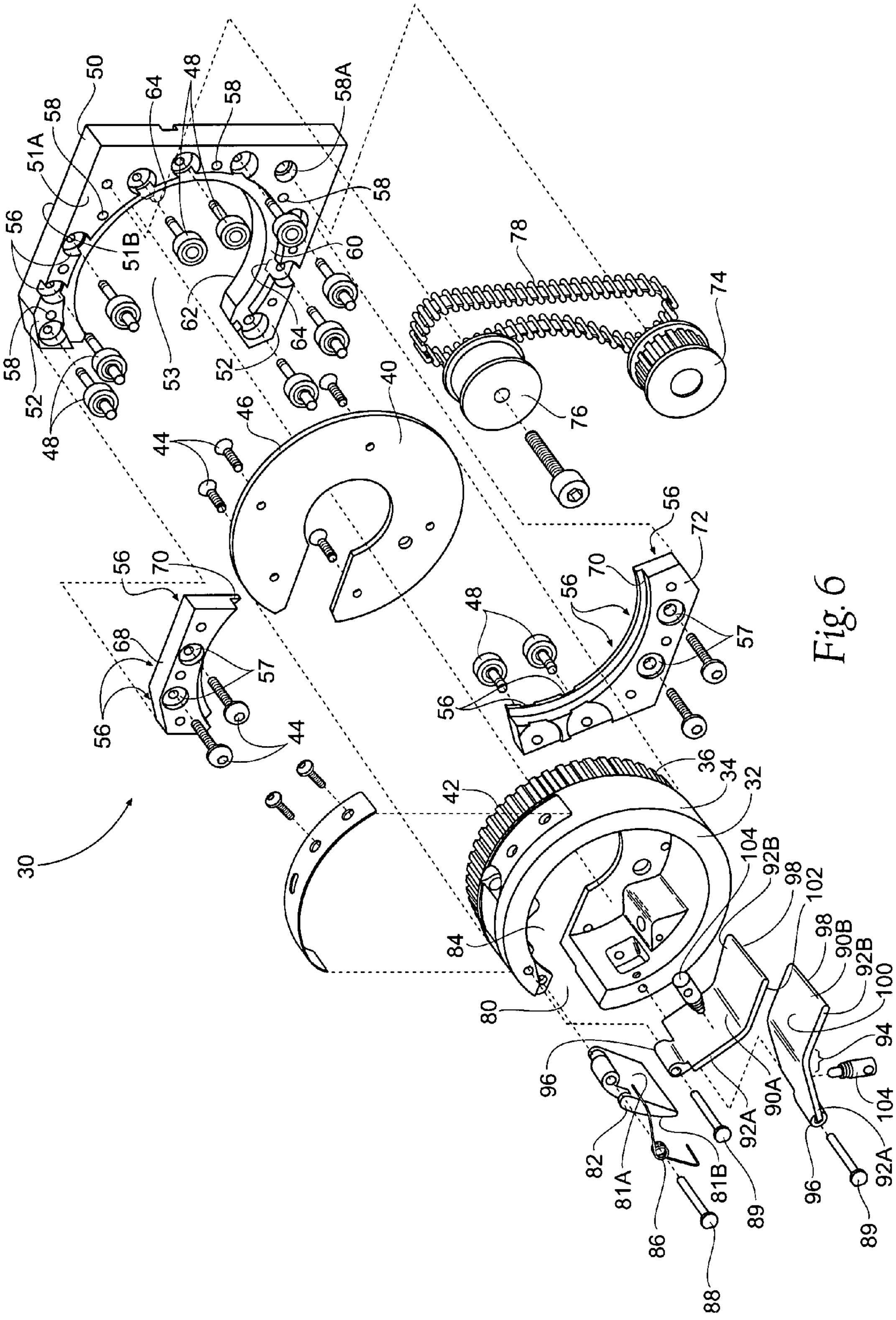
FIG. 6 is an exploded view of the puck assembly and drive belt of the present invention.

As may be seen particularly in the exploded view of FIG. 6, the puck assembly 30 further includes a c-shaped puck plate 40. The puck plate 40 is affixed to the puck element 30 on the outer edge 42, by way of screws 44 or other conventional manner and preferably includes a circumferential surface 46 in rotational contact with a plurality of circumferentially spaced roller bearings 48 located in a puck mount plate 50. The puck plate 40, when affixed to the puck element 32 on its outer edge 42 and in conjunction with the axially extending marginal support shelf 38, provides a circumferential trough 54.

As mentioned earlier and seen particularly in the view of FIG. 6, the puck assembly 30 further includes a puck mount plate 50. The puck mount plate 50 defines a relatively flat planar surface having a first side 51A, a second side 51B, and oppositely disposed arm portions 52. The oppositely disposed arm portions 52 define a generally c-shaped central aperture 53. The first side 51A of the puck mount plate further includes a plurality of circular countersunk apertures 56 through apertures 58, and a coaxial countersunk groove 60. The countersunk apertures 56 are each preferably arranged to receive a supporting roller bearing 48. The countersunk groove 60 is preferably coextensive with the marginal edge 62 of the generally c-shaped central aperture 53 and is interrupted to allow a portion of each bearing 48 to extend through a respective interruption 64 for rotational support of the circumferential surface 46 of the puck plate 40. The through apertures 58 are adapted to receive mounting bolts or screws (not shown) for mounting to a stationary supporting structure 66 (shown in FIG. 2). The countersunk groove 60 is preferably adapted to receive the outer circumferential surface 46 of the puck plate 40.

The puck assembly 30 further includes an upper puck guide member 68 having a radially inwardly extending curb surface 70, a plurality of countersunk apertures 56 to receive roller bearings 48, and a plurality of apertures with countersunk areas 57 for receiving mounting bolts or screws 44 which are in turn received by the puck mount plate 50. The radially inwardly extending curb surface 70 is preferably received in the aforementioned circumferential trough 54.

The puck assembly 30 further includes a lower puck guide member 72. The lower puck guide member 72, similarly to the upper puck guide member 68, includes an arcuate, coaxial, radially extending curb surface 70, a plurality of apertures with countersunk areas 57 for receiving mounting bolts or screws 44, and a plurality of countersunk apertures 56 for receiving additional roller bearings 48. The arcuate, coaxial radially extending curb 70 of the lower puck guide 72 is preferably arranged to be received in the circumferential trough 54 formed by the puck plate 40 and support shelf 38 of puck member 32 (see particularly FIG. 8).

Figure 7:
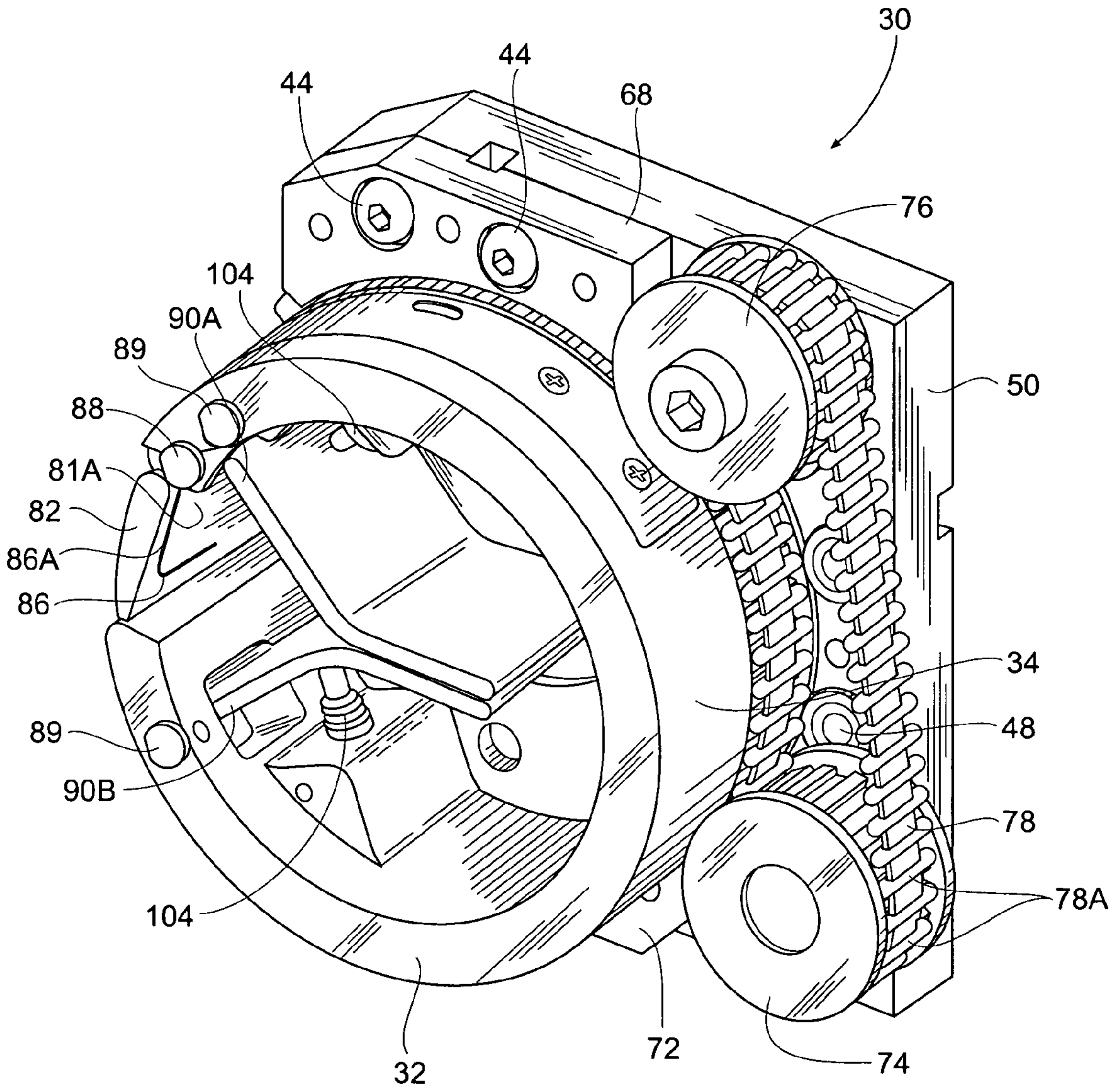
FIG. 7 is a perspective view of the puck assembly according to the present invention.
Figure 8:
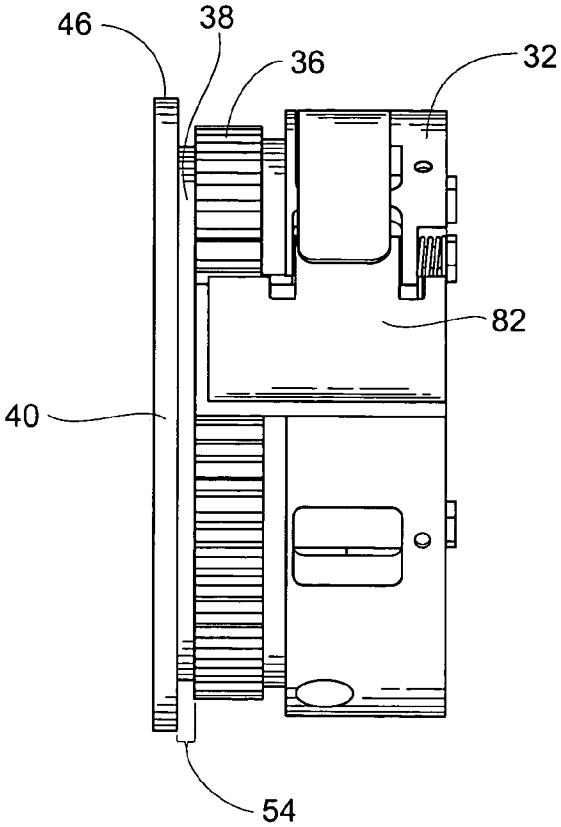
FIG. 8 is a front plan view of the puck member with affixed puck plate.
Figure 9:
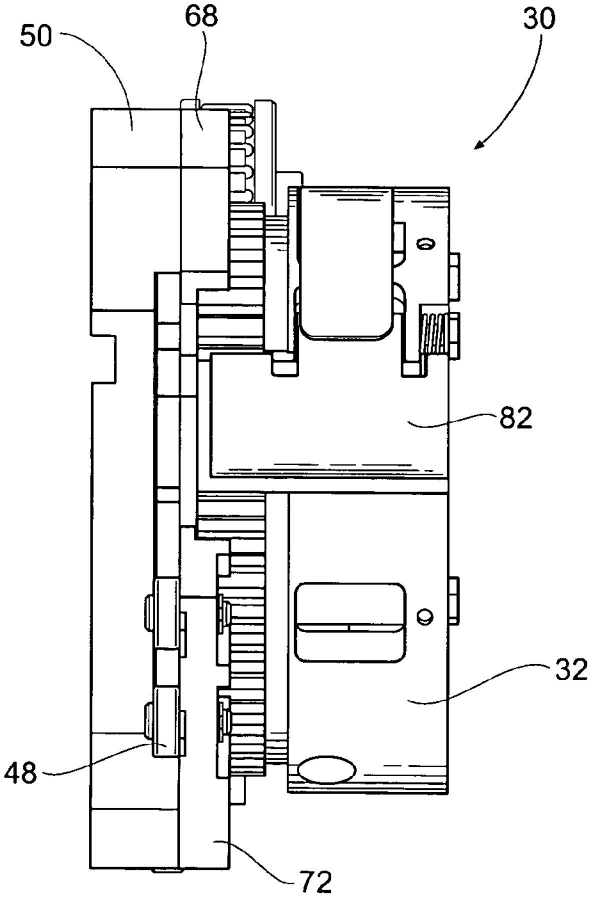
FIG. 9 is a front plan view of the puck member affixed to the puck guide members and puck mount plate.

As seen in FIGS. 6 and 7, the puck mount plate 50 includes at least one aperture 58A for receiving a drive sprocket 74. An idler pulley 76 is preferably provided and rotatably coupled to the puck mount plate 50. The drive sprocket 74 and the idler pulley 76 being spaced and arranged to support a preferably notched drive belt 78. The notched surface 78A of the drive belt 78 is adapted to engage the toothed marginal edge 36 of the puck member 32. The relationship of the components will be hereinafter discussed.

As mentioned earlier, the c-shaped puck member 32 includes an interrupted circumferential surface 34. The interrupted surface 34 defines an opening 80 for receiving an elongate object 5 (see FIGS. 2-4, inclusive) to be labeled in accordance with this invention. The opening 80 is preferably provided with a spring-loaded entrance door 82, which is arranged to provide entrance to the cavity 84 of the c-shaped puck 32 upon inward pressure exerted by the elongate object 5. A double leaf torsion spring 86 is mounted on an upstanding pin 88 located at the entrance. One leaf 86A of the spring 86 bears against the inner face 81A of the door 82 such that the door 82 is normally closed.

As seen particularly in the exploded view of FIG. 6, the puck member 32 is further provided with a pair of complementary, pivotally mounted, wing members 90A, 90B. Each wing member 90A, 90B preferably has a general configuration defining two oppositely disposed arm members 92A, 92B and defining an obtuse angle 94 therebetween. Arm members 92A each include an end 96, which is pivotally mounted at its extremity to the puck member 32 by means of respective pivot pins 89. Arm members 92B each preferably include an opposite end 98 extending inwardly of the cavity 84 and having an obverse side 100 in contact with a complementary side 102 of the second one of the pair of wing members 90A, 90B. Each of the wing members 90A, 90B is preferably normally biased toward one another by means of a respective spring loaded pin 104 bearing on the respective pivoted arm 92A, the bias of which directs the wings 90A, 90B towards one another. In this way, when an elongate object 5 is introduced past the door 82 and into the cavity 84 of the puck member 32, the inward pressure of the outer surface 145 of the elongate object 5 causes the wings 90A, 90B to separate relative to one another and thereby allow the elongate object 5 to be held between the normally contacting wing arms 92B. While the elongate object 5 is held in this position, the rotational movement of the puck element 32 causes the label 26 to be secured around the elongate object 5. While the drawings show pivoted wing members 90A, 90B including pivot pins 89, and spring loaded pin 104, it is to be understood that the present invention may be practiced using wing members 90A, 90B having an inherent bias toward one another and being rigidly suspended from the puck member 32 (not shown).

Figure 2:
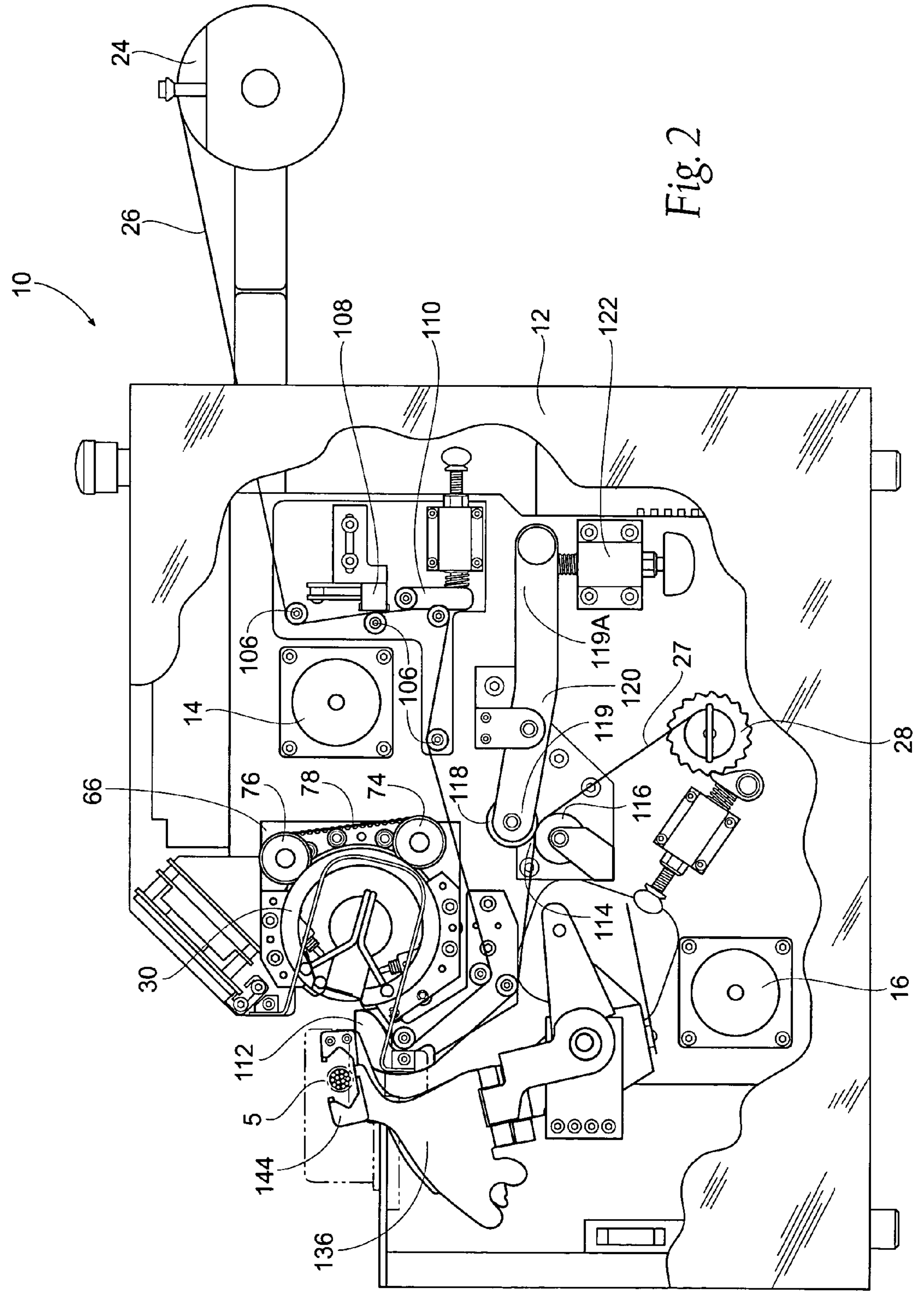
FIG. 2 is a side plan view of the side illustrated in FIG. 1, and including a partially broken away portion.
Figure 10:
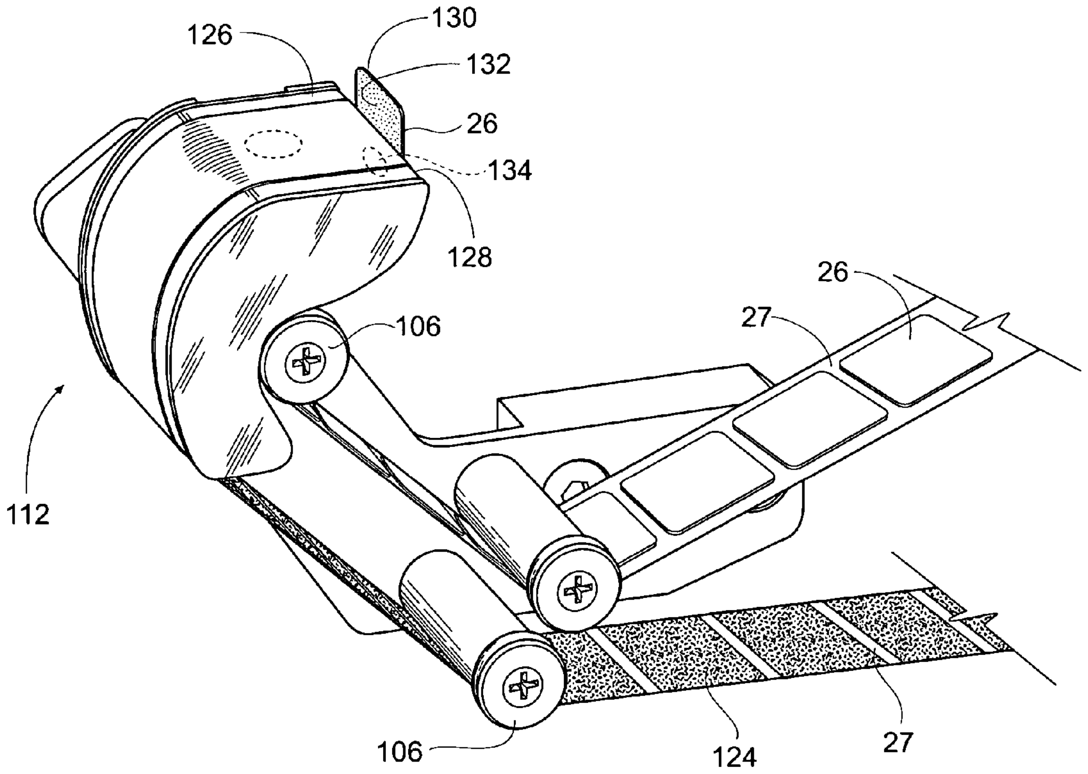
FIG. 10 is a perspective view of the label peeler assembly and showing a label partially peeled away from the backing and in position to be applied.

Prior to placement into the apparatus 10, the labels 26 may be conjoined by way of a releasable liner material 27 (as seen particularly in FIG. 10). When the labels 26 are conjoined in this way, they may be spooled on a label roller assembly 24 (see FIG. 1) for facile dispensation into the apparatus 10. As seen in FIG. 2, the spooled labels 26 may be manually threaded through the apparatus 10 prior to commencement of labeling process. The labels 26 and releasable liner material 27 are positioned in the apparatus 10 such that they are guided by rollers 106 past a sensor assembly 108, a tensioner arm 110, and a label stripping assembly 112 (all of which will be hereinafter discussed). Thereafter, the liner material 27, having been stripped of the labels 26 by label stripping assembly 112, continues past rollers 106 and into a nip 114. The nip 114 is preferably provided by a drive roller 116 and a cooperating idler roller 118. The idler roller 118 is mounted at the distal end 119 of a pivoted lever arm 120 that is pivotally supported intermediate its ends 119, 119A and which the free end 119A is supported by an adjustable, spring biased tensioner 122. The drive roller 116 is designed to pull the backing material 27 through the apparatus 10 and after labels 26 have been removed, onto a take-up roll 28, as mentioned earlier.

As earlier mentioned, the labels 26 and backing material 27 are pulled through the apparatus 10 and past the sensor assembly 108. The backing material 27 is preferably overprinted with a band of transparent UV ink, in order to define datum marks 124 (see particularly FIG. 10). The sensor assembly 108, such as an infrared sensor, is arranged to detect the datum marks 124 between successive labels 26, SO that the apparatus 10 can determine label 26 presence and spacing as well as incremental movement of the labels through the apparatus 10, and alternatively, determine where to form prints on successive labels 26, if supplied with a printer (not shown) for on demand label printing. In order to achieve this, the sensor assembly 108 comprises a light source (not shown), which illuminates the backing material 27 with UV light. UV light is reflected from the backing material 27 onto a UV sensor (not shown) disposed adjacent the light source. The output of the sensor is connected to a control unit via a level detector. In use, a greater amount of UV light is reflected by the backing material 27 when the datum marks 124 pass the sensor. The level detector is arranged to detect the increased output level of the sensor and in this manner an assembly control circuit can control the position of successive labels 26 to correspond with the position of the successive marks 124 as the backing material 27 and attached labels 26 advance through the apparatus 10.

As seen in the Figures, the labels 26 and backing material 27 are moved toward a label removal device, such as a label stripper assembly 112, by way of the drive roller 116, mentioned earlier. As is detailed in the view of FIG. 10, the label stripper assembly 112 includes a supporting table 126 having an edge 128 over which the labels 26 and attached backing 27, pass, thereby peeling an edge 130 of a passing label 26 from the backing material 27 and exposing an adhesive surface 132 for initial contact with an elongate object 5 (not seen in this view) prior to entry into the cavity 84 of the puck element 32 (see FIGS. 12-14, for example). The label stripping assembly 112 further preferably includes a label sensor 134 arranged to detect the presence of a label 26 in the proximity of the puck member 32.

Figure 4:
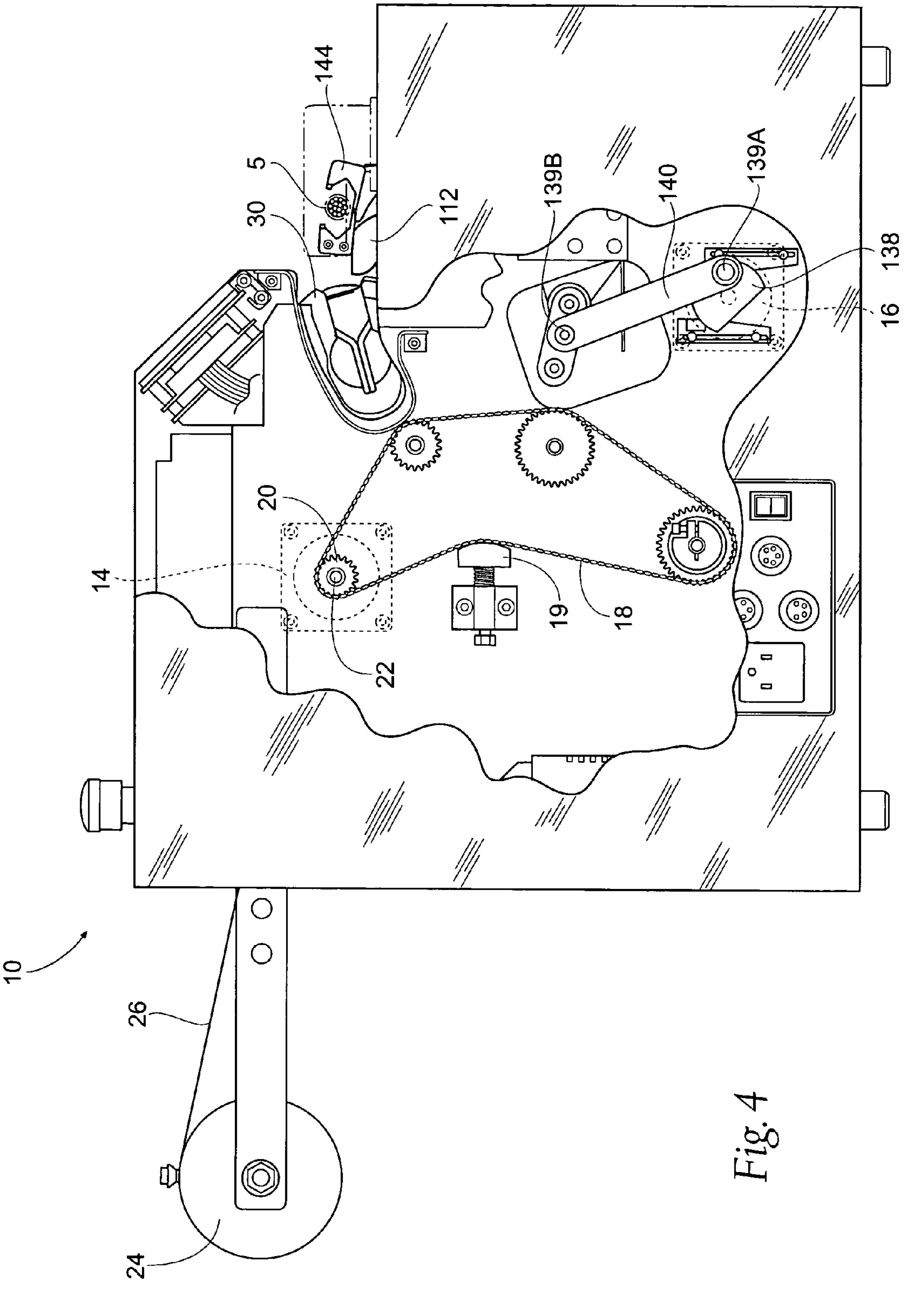
FIG. 4 is a side plan view similar to that of FIG. 3, but with the circuit board removed for ease of viewing.
Figure 5:
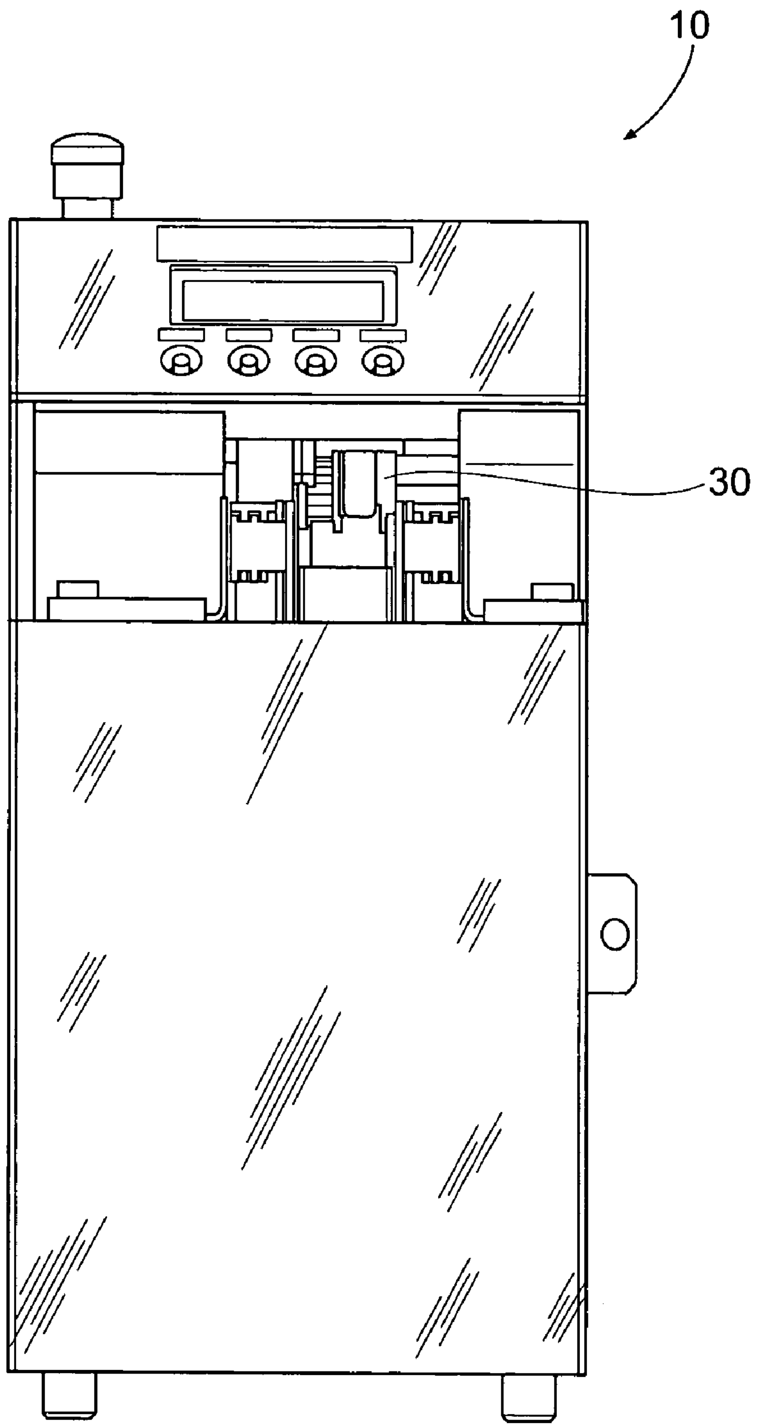
FIG. 5 is a front plan view of the present invention.

The apparatus 10 further preferably includes a gripper assembly 136 for alternatively grasping and positioning an elongate article 5 to be labeled. The gripper assembly 136 is preferably independently operated by a gripper motor 16, as mentioned earlier. As shown in FIG. 4, the gripper motor 16 drives an eccentric rotor 138, which is pivotally attached to one end 139A of a linkage 140. The opposite end 139B of the linkage 140 provides rotative motion to gripper elements 142, thereby allowing grasping and ungrasping of an object, such as the elongate article 5 shown in these views. As seen, the gripper elements 142 each preferably include a pair of spaced apart, openable jaw members 144. As may be seen particularly in FIGS. 11-20, inclusive, the jaw members 144 are adapted to receive, grasp, and position an elongate object 5 relative the puck member 32. While the gripper elements 142 are shown as being spaced apart a predetermined distance to one another it is to be understood that the predetermined distance may be varied according to need, or alternatively may be adapted to put longitudinal tension on a grasped elongate object 5, thereby holding the object 5 taut for the labeling process.

Figure 11:
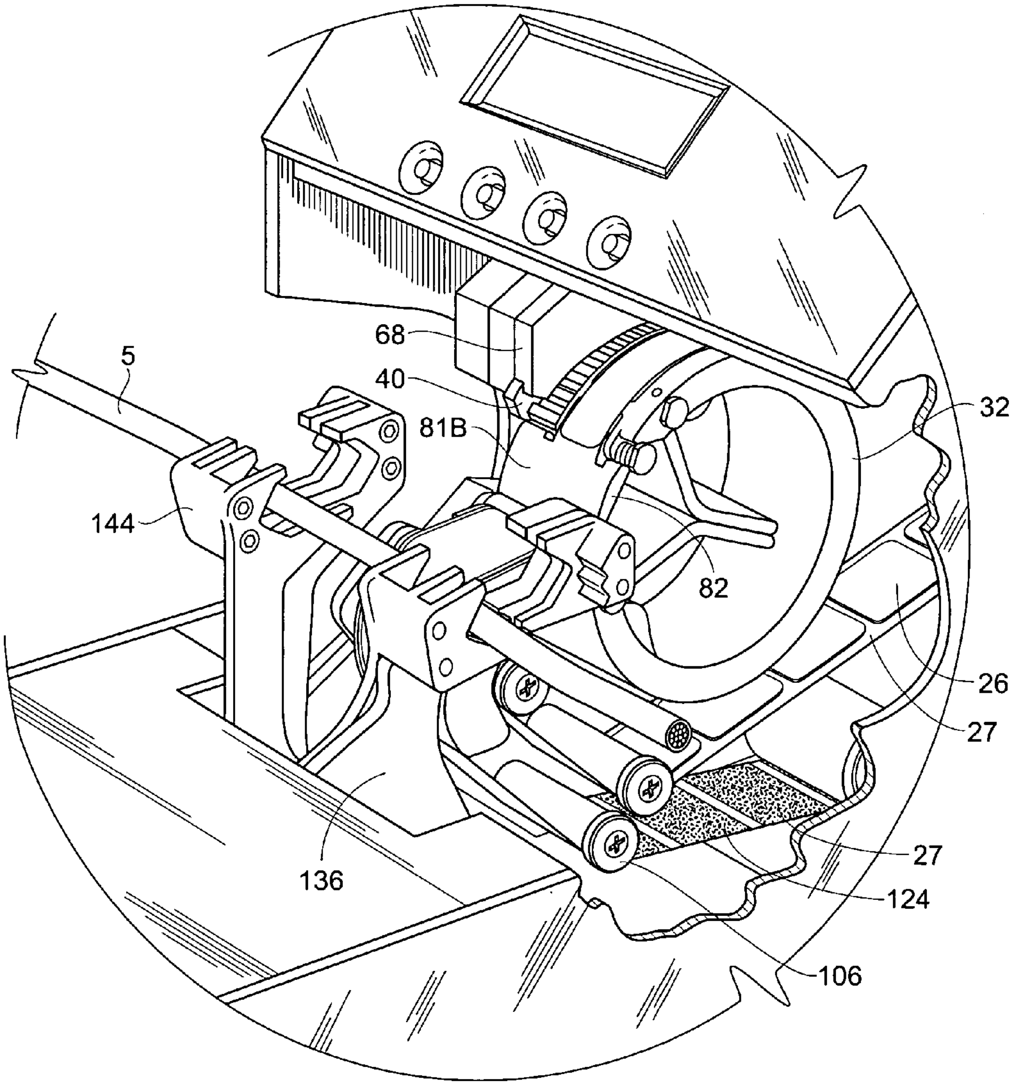
FIG. 11 is a fragmentary perspective view of the present invention and showing an elongate object in place in the gripper arms and ready to be inserted into the puck member.

The operation of the present assembly 10 will be next described in connection with FIGS. 11-20, inclusive. As seen in FIG. 11, an elongate object 5 is placed in the spaced apart open jaw members 144 of the gripper assembly 136 prior to movement of the closed jaws 144. As mentioned earlier, it is to be noted that while the Figures show the pair of jaws 144 spaced apart a predetermined distance, this apparatus 10 may also be adapted to vary the distance between the jaws 144.

Figure 12:
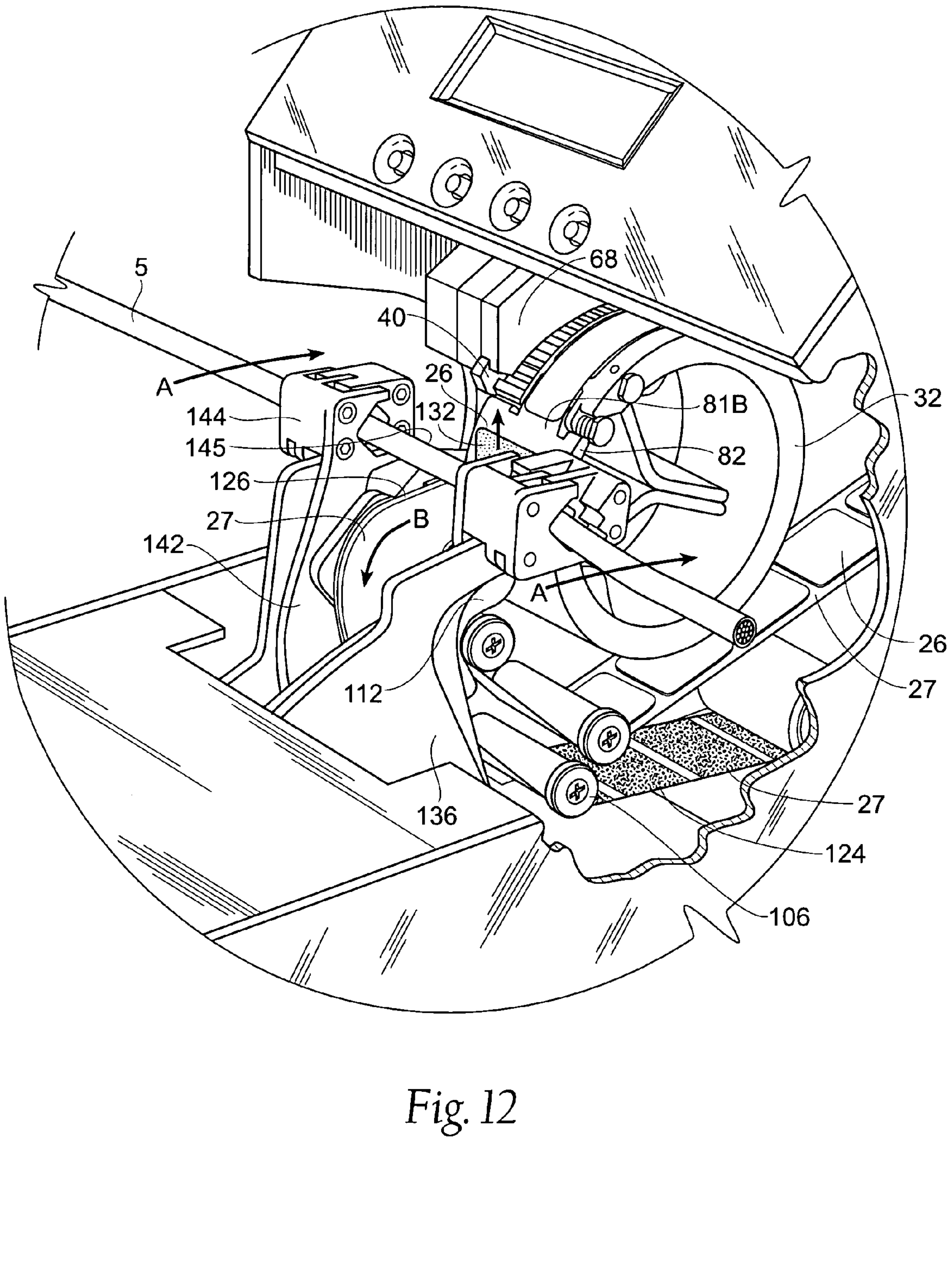
FIG. 12 is a fragmentary perspective view similar to that of FIG. 11, but showing the gripper arms closed around an elongate object and moving toward a presented label.

FIG. 12 illustrates the jaws 144 closed about an elongate object 5 and moved inwardly in the direction of arrows A. A label 26 with an exposed adhesive portion 132 is presented and ready for contact with the outer surface 145 of an elongate object 5. Further, spent liner material 27 is illustrated as being moved over the supporting table 126 of label stripping assembly 112 and toward the take-up roll 28 (see FIG. 2) in the direction of arrow B. With reference to FIG. 2, it may be seen that the spent liner material 27 moves through the aforementioned nip 114 and onto the take-up roll 28.

Figure 13:
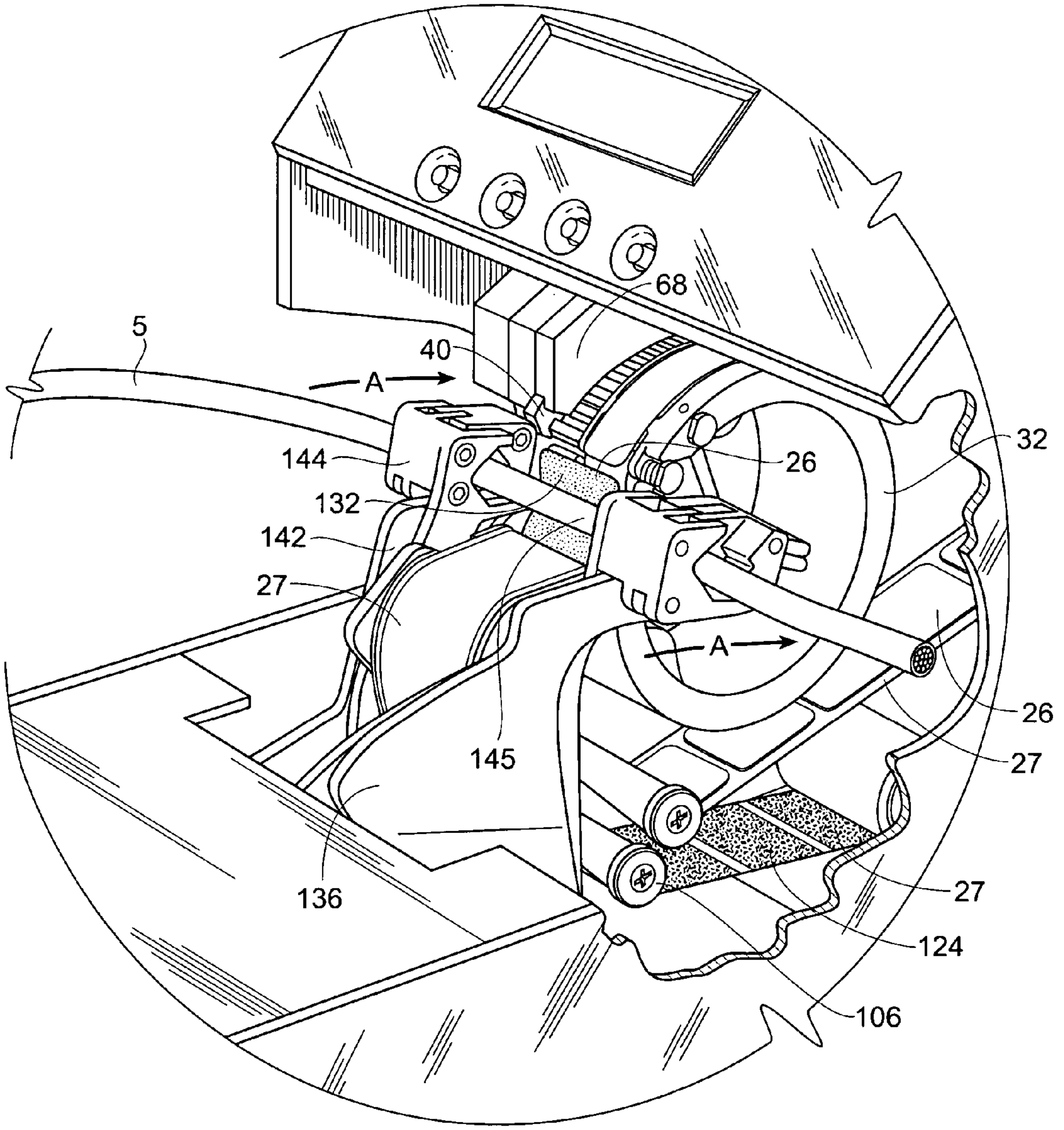
FIG. 13 is a fragmentary perspective view similar to those of FIGS. 11 and 12, but showing an elongate article engaging an adhesive surface of a presented label.

As seen in FIG. 13, the gripper elements 142, jaw members 144 and the elongate object 5 further travel in the direction arrows A and toward the outer face 81B of the door 82 of puck member 32, as discussed earlier. This movement further engages the exposed adhesive surface 132 of label 26 with the outer surface 145 of the elongate object 5.

Figure 14:
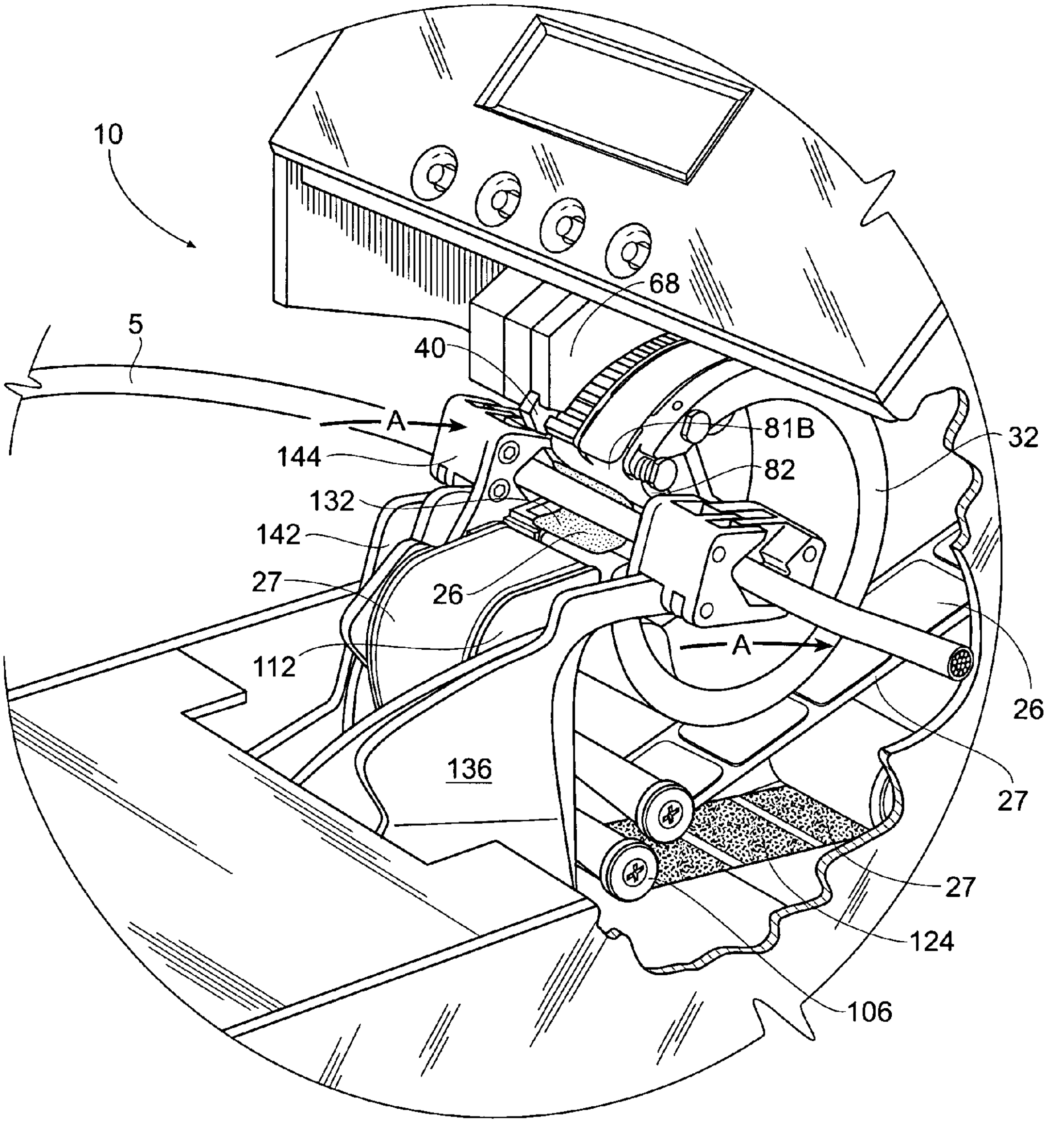
FIG. 14 is a fragmentary perspective view similar to those of FIGS. 11-13, inclusive, but showing the gripper arms pushing the elongate object and engaged label against the puck door and toward the puck cavity.
Figure 15:
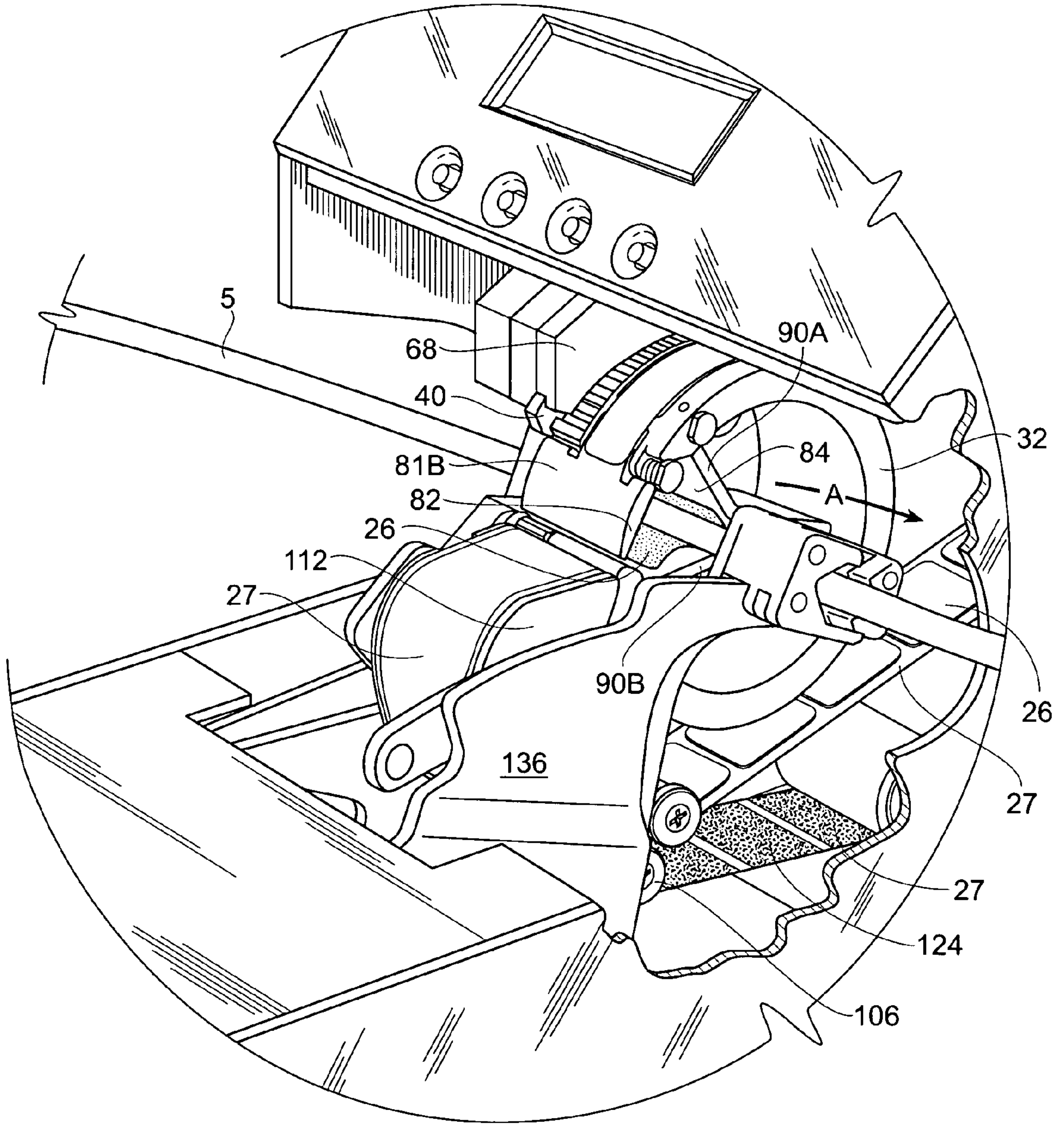
FIG. 15 is a fragmentary perspective view similar to those of FIGS. 11-14, inclusive, but showing the gripper arms pushing the elongate object and engaged label into the puck cavity.
Figure 16:
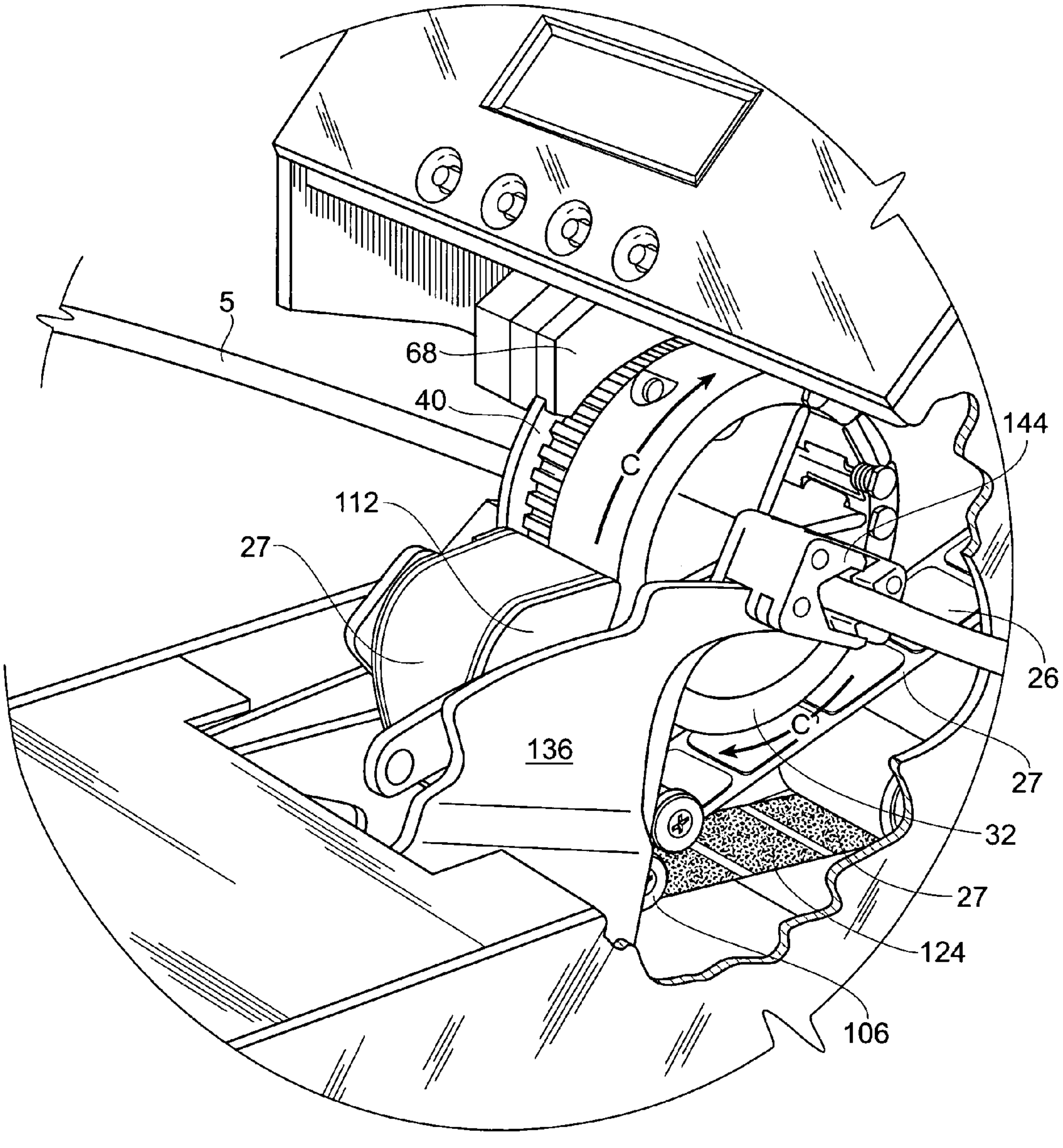
FIG. 16 is a fragmentary perspective view similar to those of FIGS. 11-15, inclusive, but showing the elongate object and engaged label in the puck cavity and the puck rotating thereabout thereby securing the label around an elongate object.

As further seen in FIG. 14, the elongate object 5 and partially adhered label 26 are further moved in the direction of arrows A and pushed against the outer face 81B of the door 82. As seen, this movement partially opens the door 82 into the cavity 84 (not seen in this view) of the puck member 32. The apparatus 10 is adapted to allow for varying dwell times of the elongate object 5 against the outer face 81B of the door 82, thereby allowing greater or lesser adhesive surface portions 132 to be engaged prior to puck rotation. FIG. 15 depicts the elongate object 5 and partially attached label 26 further moved in the direction of arrow A into the cavity 84 of the puck member 32 and against the biased wing members 90A, 90B in readiment for rotational movement of the puck member 32. FIG. 16 illustrates the puck member 32 rotating in the direction of arrow C, thereby securing the label 26 around the elongate object 5. The puck member 32 rotates at a predetermined speed for a predetermined number of revolutions, which depend on the type and size of elongate article 5 and label 26 to be utilized.

Figure 17:
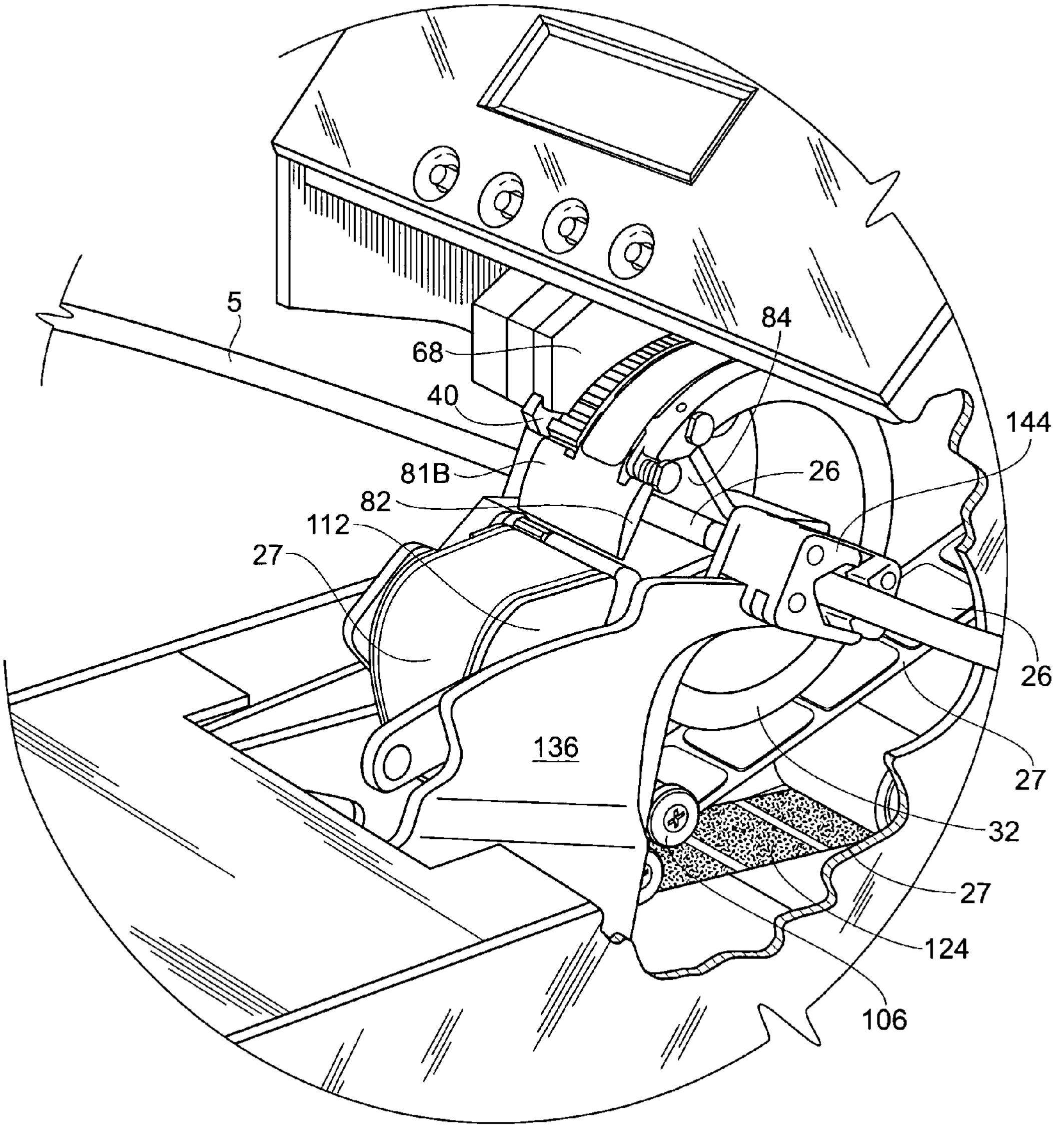
FIG. 17 is a fragmentary perspective view similar to those of FIGS. 11-16, inclusive, but showing the puck member in finished position with a label wrapped around an elongate object.
Figure 18:
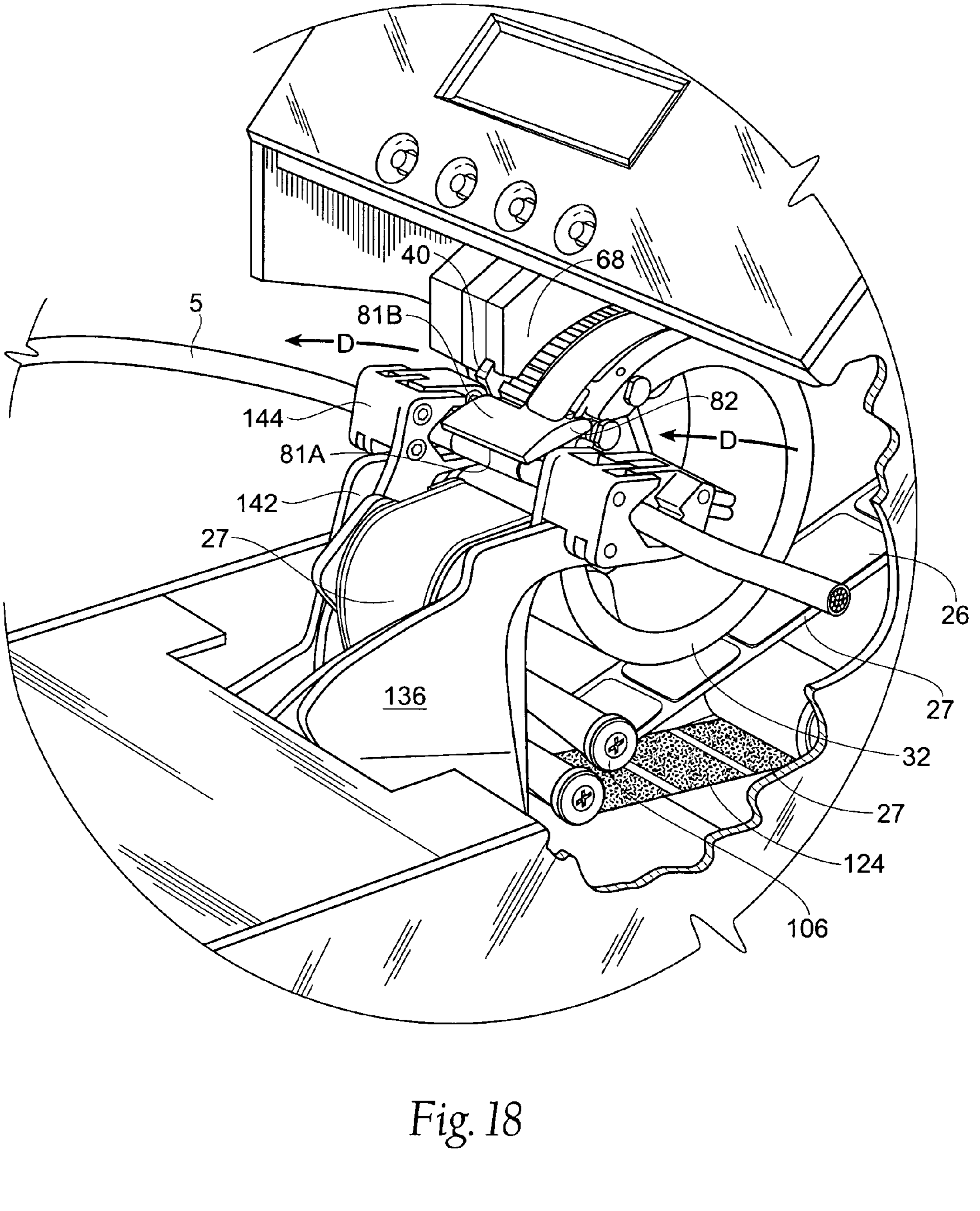
FIG. 18 is a fragmentary perspective view similar to those of FIGS. 11-17, inclusive, but showing the gripper arms moving an elongate object with wrapped label from the puck cavity and past the puck door.
Figure 19:
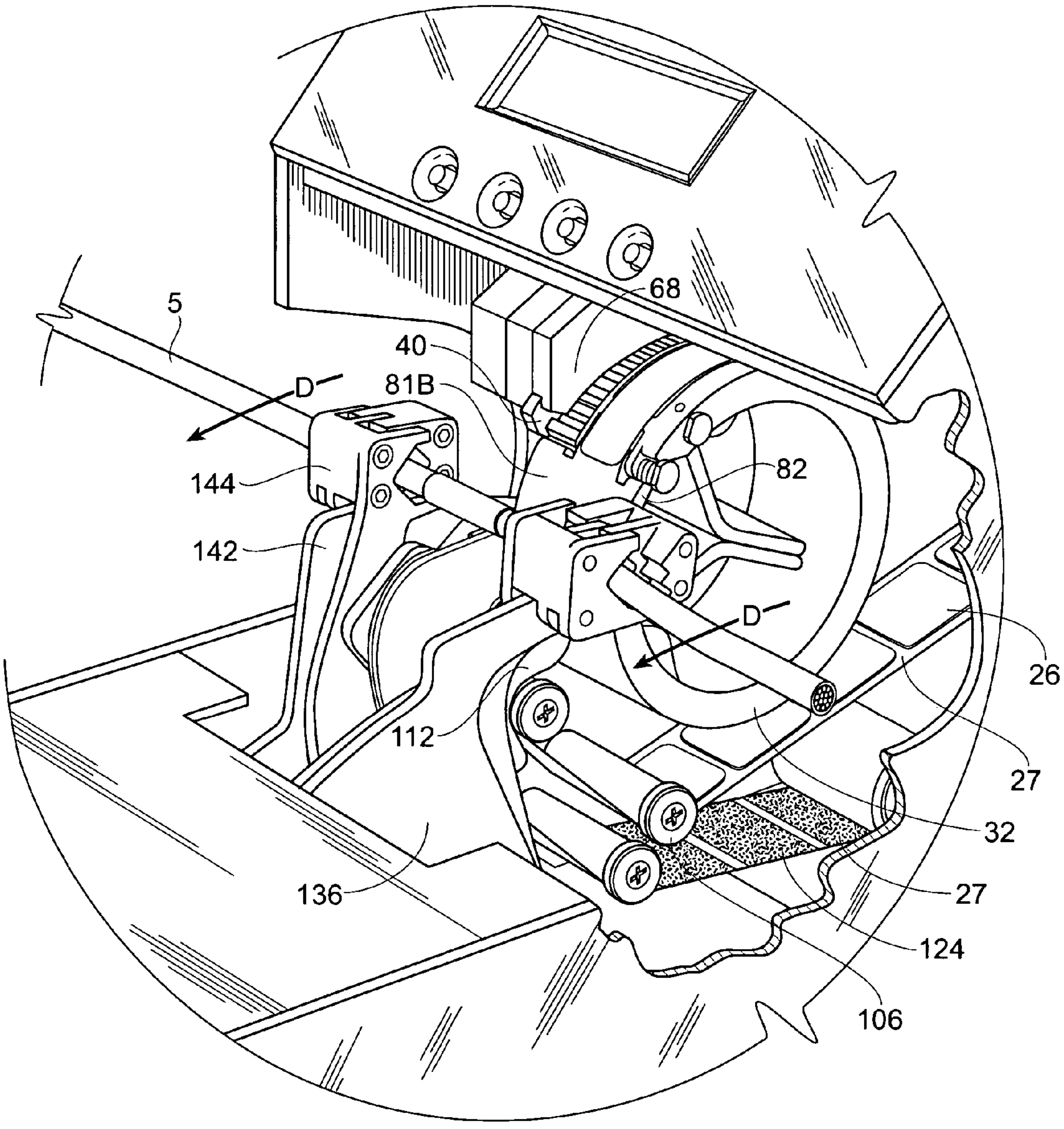
FIG. 19 is a fragmentary perspective view similar to those of FIGS. 11-18, inclusive, but showing the finished, wrapped elongate object removed from the puck cavity.
Figure 20:
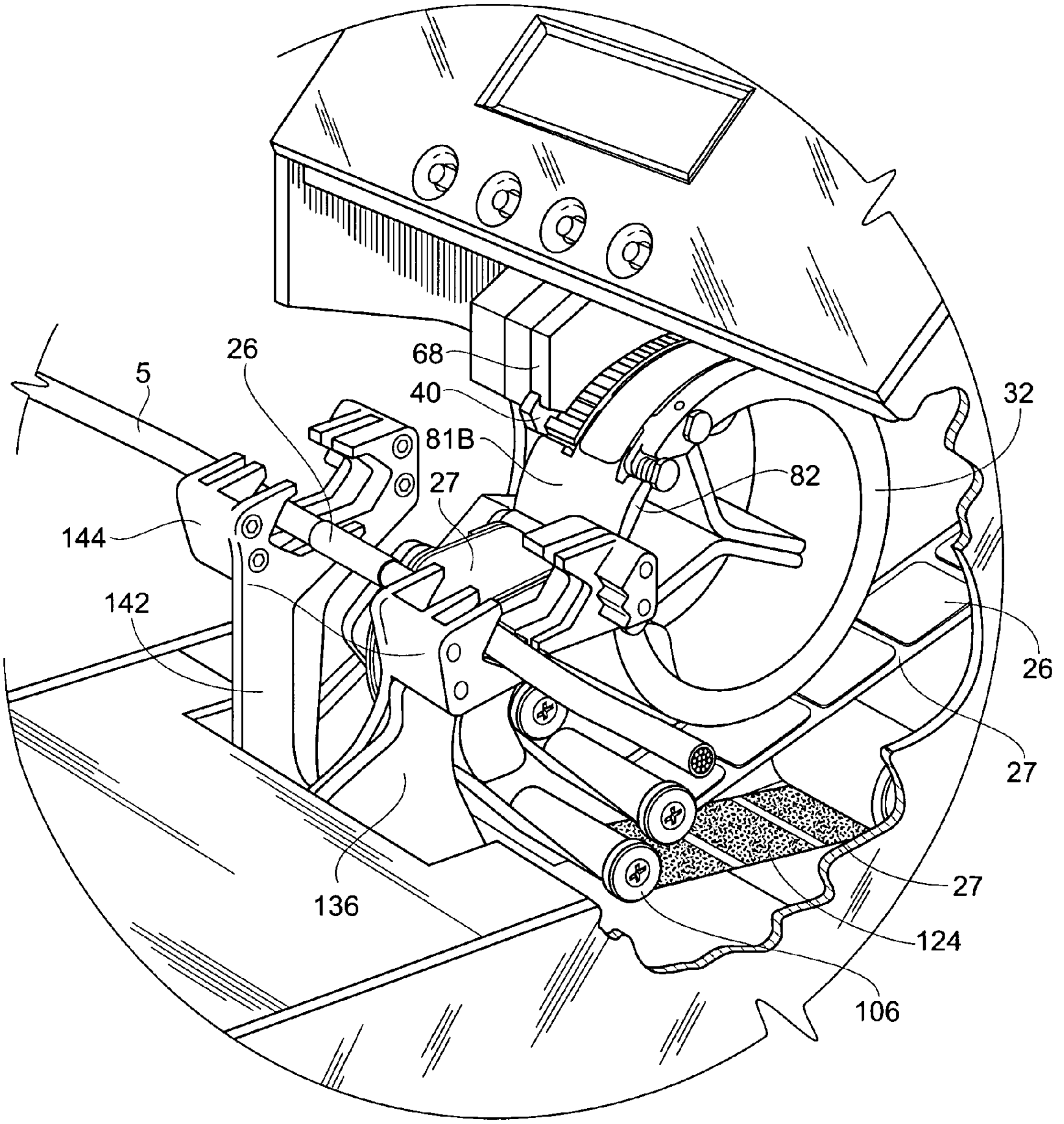
FIG. 20 is a fragmentary perspective view similar to those of FIGS. 11-19, inclusive, but showing the gripper arms in open position to release the finished, wrapped elongate object.

As seen in FIG. 17, and after completion of a predetermined revolution cycle, the puck element 32 returns to a finished position. The label 26 may be seen as fully secured about the elongate object 5 while remaining in the puck cavity 84. FIG. 18 illustrates the gripper elements 142, jaw members 144, and elongate article 5 with label 26 attached, moving in the direction of arrows D. This movement pushes the elongate object 5 against the inner face 81A of door 82, thereby opening the door 82 for removal of the object 5 and attached label 26 from the puck cavity 84, as seen in FIG. 19. FIG. 20 shows the elongate article 5 with label 26 applied thereabout, and jaw members 144 in the open position for removal of elongate article 5.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for supplying and wrapping elongate articles with labels, and capable of handling elongate articles for wrapping a label thereabout, said labels having an adhesively coated side, said elongate articles each having a peripheral surface, said apparatus including:

a label roller assembly for supplying labels to said apparatus;

a rotatable puck mechanism, said puck mechanism having an interrupted circumferential wall at least partially surrounding a cavity, and at least one wing member coupled to said circumferential wall, said wing member extending into said cavity;

means for rotating said puck mechanism;

means for transporting at least one of said labels toward an interruption in said puck mechanism circumferential wall; and means for transporting said peripheral surface of said elongate article through said interruption in said puck mechanism circumferential wall, wherein said at least one wing member comprises:

a first arm having a first arm first end coupled to said circumferential wall and a first arm second end opposite said first end; and a second arm having a second arm first end coupled to said first arm second end at an obtuse angle.

2. The apparatus of claim 1, said first and second arms being substantially planar.

3. The apparatus of claim 1, said wing member second arm further comprising:

a free-floating second arm second end opposite said second arm first end.

4. The apparatus of claim 1, said first arm first end being pivotally coupled to said circumferential wall.

* * * * *